United States Patent [19]

Walser et al.

[11] 3,727,053
[45] Apr. 10, 1973

[54] METHOD AND APPARATUS FOR DETECTING RADIATION BY MEANS OF THE PYROMAGNETIC EFFECT

[76] Inventors: Rodger M. Walser, 2407 Trail of Madrones; Robert W. Bené, 4904 Timberline, both of Austin, Tex. 78746

[22] Filed: May 3, 1971

[21] Appl. No.: 139,707

[52] U.S. Cl. ........250/83.3 H, 250/83 R, 250/83.3 R
[51] Int. Cl. ................................................G01s 5/00
[58] Field of Search ......................250/83 R, 83.3 R, 250/83.3 H; 324/34 R

[56] References Cited

UNITED STATES PATENTS

| | | | |
|---|---|---|---|
| 2,222,425 | 11/1940 | Wehe | 250/83.3 H X |
| 2,953,688 | 9/1960 | Maxwell, Jr. et al. | 250/83.3 H |
| 3,219,823 | 11/1965 | Gibson et al. | 250/83.3 H |

OTHER PUBLICATIONS

Pyromagnetic Effect: A Method for Determining Curie Points, by A. G. Chynoweth, from Journal of Applied Physics, Vol. 29, No. 3, Mar. 1958, pp. 563-565.

Primary Examiner—Archie R. Borchelt
Attorney—Barnes, Kisselle, Raisch & Choate

[57] ABSTRACT

Method and apparatus for detecting electromagnetic radiation by means of the pyromagnetic effect. A pyromagnetic material is magnetically and thermally biased for operation within a magnetic transition region. Within the magnetic transition region the magnetic moment of the material changes very rapidly with temperature. Time-varying radiation incident upon the pyromagnetic material is transformed into heat to produce a time rate of change in the material temperature and thereby a time rate of change in the magnetic moment. The changing magnetic moment induces a voltage in a coil to indicate that radiation has been detected.

17 Claims, 14 Drawing Figures

INVENTORS
RODGER M. WALSER
ROBERT W. BENÉ
BY
Barnes, Kisselle, Raisch & Choate
ATTORNEYS INVENTORS
RODGER M. WALSER
ROBERT W. BENÉ
BY
Barnes, Kisselle, Raisch & Choate
ATTORNEYS

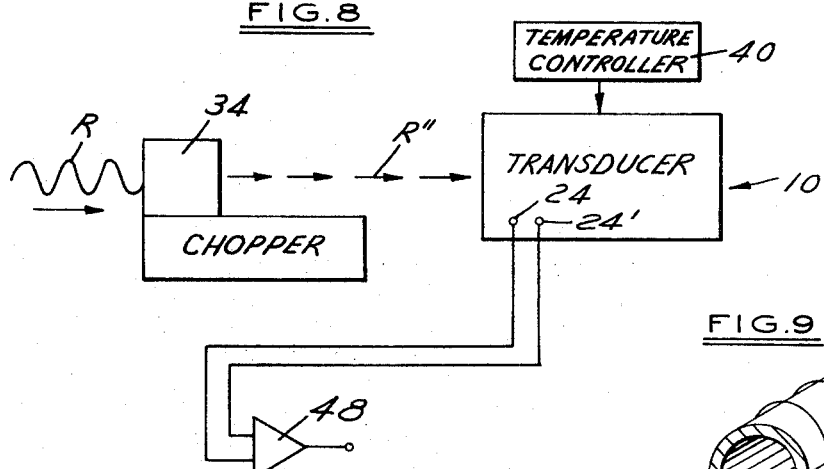
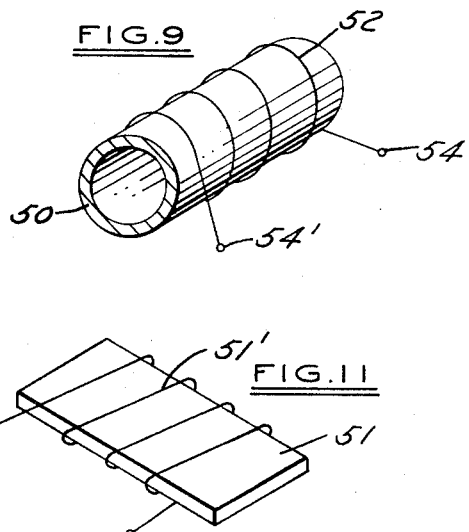
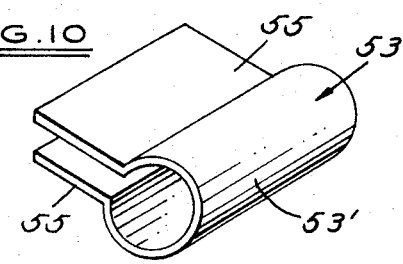
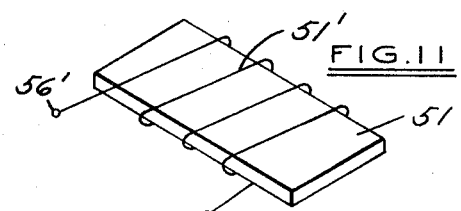
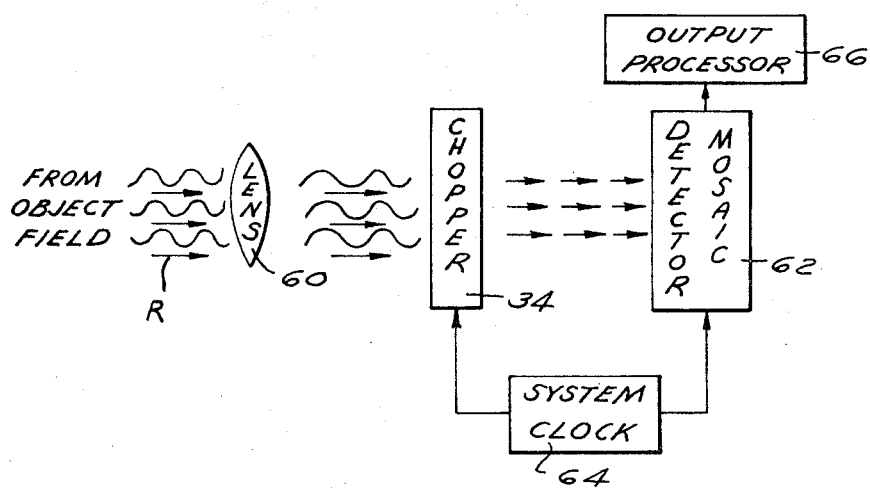

METHOD AND APPARATUS FOR DETECTING RADIATION BY MEANS OF THE PYROMAGNETIC EFFECT

This invention relates to radiation detection and more specifically to method and apparatus for detecting electromagnetic radiation by means of the pyromagnetic effect.

The physical phenomenon of pyromagnetism occurs when the thermal energy, that is the temperature, of a magnetic material changes. As the thermal energy varies, the magnetic parameters associated with the material also vary. For example, in a piece of magnetized manganese germanide an increase in thermal energy results in a decrease in the magnetic moment of the material. In some materials these variations are gradual, while in others they are more pronounced. By magnetically and thermally biasing a material so that the magnetic moment thereof is very sensitive to the thermal energy of the material, the time rate of change of the magnetic moment may be monitored to indicate a time rate of change in thermal energy. Since a time rate of change in the thermal energy of the material occurs when time-varying radiation is directed upon it, it may be operated effectively as a detector of this radiation by measuring the voltage induced in a coil surrounding it, the voltage being proportional to the time rate of change of the magnetic moment.

In recent years significant attention has been directed toward electromagnetic radiation detectors which utilize the pyroelectric effect, the electromagnetic dual of the pyromagnetic effect. The advantages offered by such detectors include fast response, room temperature operation, wide band operation and good sensitivity. Pyromagnetic detectors afford additional advantages over pyroelectric detectors including lower output impedance, faster response time, and a substantially wider range of available pyromagnetic materials thereby allowing detector operation over wide temperatures ranges. Pyromagnetic sensors may be miniaturized for arrangement in an array configuration.

Accordingly, the principal objects of the present invention are the provision of method and apparatus for detecting electromagnetic radiation by means of the pyromagnetic effect.

Another object of the invention is the provision of method and apparatus for calibrating the aforementioned apparatus.

A further object of the invention is to provide an electromagnetic radiation detector which is characterized by both a relatively low output impedance and a relatively fast response time over a wide range of radiation signal frequencies.

It is also an object of the invention to provide an electromagnetic radiation detector which is capable of operation over a wide temperature range.

Still another object of this invention is the provision of an electromagnetic radiation detector which is readily susceptible to miniaturization for use in an array configuration.

Other objects and features of the invention will be apparent in the following description and claims wherein the principles of the invention and the operation are disclosed in connection with the best mode presently contemplated for the practice of the invention.

In the drawings:

FIG. 8 is a schematic block diagram of the pyromagnetic detector of the present invention.

FIG. 9 is a perspective view showing a first modification of the pyromagnetic transducer of FIG. 1.

FIG. 10 is a perspective view showing a second modification of the pyromagnetic transducer of FIG. 1.

FIG. 11 is a perspective view showing a third modification of the pyromagnetic transducer of FIG. 1.

FIG. 12 is a schematic block diagram of an object scanning device embodying the pyromagnetic detector of the present invention.

Figure 1:
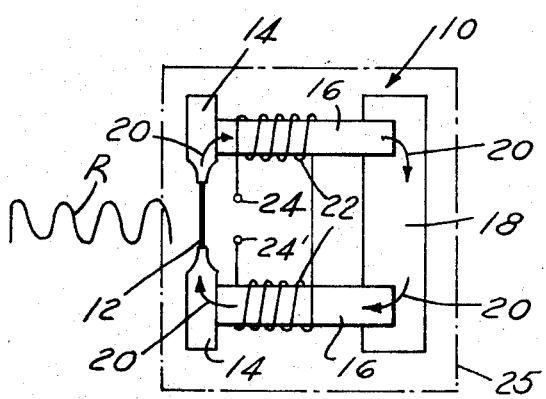
FIG. 1 is a side elevational view of a schematic representation of a pyromagnetic transducer of the present invention.

Referring to FIG. 1, a pyromagnetic transducer shown generally at 10 comprises a sensor 12 formed of a pyromagnetic material and clamped between ferrite pole shoes 14 for receiving incident radiation R. Ferrite legs 16 extend from a ceramic magnet 18 to each pole shoe 14 thereby completing a magnetic circuit through sensor 12 as indicated by arrows 20. A detector coil 22 having output terminals 24, 24' is wound on legs 16 to provide the pyromagnetic output signal. Transducer 10 is situated within a temperature-controlled environment as indicated by the dot-dash line 25. This arrangement provides both magnetic and thermal biases for sensor 12, the proper amount of each bias depending upon the particular material of sensor 12. The characteristics of some of the pyromagnetic materials which have been successfully used in the present invention will be later described.

The magnetic bias of magnet 18 produces a magnetic moment, or magnetization, within sensor 12. It is to be understood that the terms "magnetic moment" and "magnetization" are used interchangeably and that they include both the spontaneous and the induced magnetizations of sensor 12. Ideally, the magnetic circuit characteristics of transducer 10 should provide both a large magnetization and a large incremental permeability. The reason for these two requirements is so that very small pyromagnetic signals may be detected, thereby providing a highly sensitive detector as will be better understood from subsequent description. Unfortunately, these two requirements are inconsistent because of the tendency of magnetic material to saturate as its magnetic moment, or magnetization, increases. Therefore, the illustrated arrangement is a compromise between the two requirements. Shoes 14 and legs 16 are a "soft" ferrite such as the nickel-zinc ferrites sometimes used in transformer cores. Magnet 18 on the other hand is an insulating ferrite such as barium ferrite. Magnetic circuit 20 provides a sufficiently large magnetic moment in sensor 12 without magnetically saturating legs 16. Hence, the incremental permeability of legs 16, and therefore the transducer sensitivity, remain relatively high.

To obtain optimum sensitivity, sensor 12 is customarily, but not necessarily, magnetically saturated by the magnetic bias of magnet 18 (this depends on the particular sensor material used) and temperature biased within a magnetic transition region (to be described later), preferably where a small temperature variation produces the largest variation in the magnetic moment. As radiation R is directed on sensor 12, it absorbs a portion of this incident energy as heat, and the sensor temperature increases very slightly. This time rate of change of temperature causes a time rate of change of the magnetic moment in sensor 12 via the pyromagnetic effect. This change is reflected throughout magnetic circuit 20, and the changing magnetization correspondingly changes the magnetic flux passing through coil 22. Consequently, a pyromagnetic signal voltage appears across terminals 24, 24'. Coil 22 is wound on legs 16 so that the voltages induced in each portion of the coil by changes in the magnetic moment of magnetic circuit 20 are additive, while the voltages induced by external magnetic fields are cancelled.

It is to be observed from the previous paragraph that a pyromagnetic signal is produced between terminals 24, 24' in response to a time rate of change in the temperature of sensor 12. This differential mode of operation is characteristic of the pyromagnetic detector of the invention. Because of this feature, the response of transducer 10 does not depend on sensor 12 reaching thermal equilibrium with radiation R. On the contrary, transducer 10 operates properly to provide a pyromagnetic signal only when the thermal energy of sensor 12 is changing. The energy content of radiation R which is transformed into thermal energy within sensor 12 is very small, and hence the temperature change in sensor 12 is extremely small. Because pyromagnetic materials can operate properly as radiation sensors over temperature ranges which are large compared to the temperature variation therein produced by incident radiation, heat dispersion from sensor 12 presents no problem. The regulated temperature environment maintains the proper temperature bias for sensor 12 over a given temperature range. The differential mode operational feature affords additional advantages which will be better understood from later description.

It should be pointed out here that the pyromagnetic detector of the invention is well suited for very broad band operation from the far infra-red region into the ultra-violet region. This is because the metallic nature of certain pyromagnetic materials can readily absorb radiant energy over this range. In this respect, it has been found that pyromagnetic detectors are superior to pyroelectric detectors. Almost all pyroelectric materials are dielectric and hence may require a thermal matching layer (i.e., a black body) to absorb radiation. This thermal matching layer increases the thermal delay time thus reducing the detector frequency response and sensitivity. On the other hand, pyromagnetic detectors of the metallic type can absorb radiation without such a thermal matching layer. Therefore, the response characteristics of the pyromagnetic detector are superior to those of the pyroelectric detector in this respect.

As in certain other types of detection apparatus, a knowledge of the nature of the incident radiation R is necessary for proper detection to occur. Because the pyromagnetic detector of the invention operates in a differential mode, it is to be observed that the nature of the incident radiation must be such as to produce a time rate of change in sensor temperature. Hence, the intensity of radiation R incident upon sensor 12 must also be time-variant. Moreover, the rate of variation must be greater than some minimum rate as determined by the sensitivity of transducer 10. In other words, if the intrinsic nature of the source of radiation R is such that the intensity of radiation R varies as a function of time at a high enough rate, then transducer 10 responds to the radiation by producing a pyromagnetic signal voltage between terminals 24, 24', and hence detects the radiation. On the other hand, if the rate of variation is too low, then transducer 10 fails to produce a pyromagnetic signal voltage in response to the incident radiation and hence does not detect the radiation. To enable the radiation to be detected in this latter case, radiation R must be modulated by modulation means at either the source or the detector. For example, relatively low modulation frequencies can be provided by mechanical chopping, and higher frequencies by electro-optical modulation. It should be understood that such modulation may be performed in accordance with known communication theory techniques so that useful information may be derived by the pyromagnetic detector from the radiation incident thereon. At one end of the scale, the modulation frequency and the intensity of incident radiation must be such as to produce at least the minimum requisite variational rate in radiation intensity on sensor 12 so that transducer 10 can detect the radiation. At the other end of the scale, the modulation rate must not cause so high a variational rate as to be greater than the upper limit of the response range of transducer 10. However, the maximum modulation rate for a pyromagnetic detector can be greater than that for a pyroelectric detector because of the superior response characteristics of pyromagnetic materials of the metallic type. It should, of course, be understood that changes in the controlled environmental temperature of transducer 10 are too slow for the transducer to respond to, whereas the transducer does respond to the temperature changes in sensor 12 produced by sufficiently large variations in intensity of the incident radiation thereon.

Figure 2:
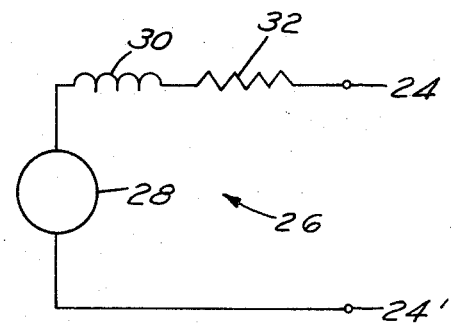
FIG. 2 is a schematic diagram showing the equivalent circuit of the pyromagnetic transducer of FIG. 1.

The equivalent circuit 26 of pyromagnetic transducer 10 is shown in FIG. 2. The circuit comprises a pyromagnetic voltage source 28, an inductance 30 and a resistance 32 connected in series. Since detector coil 22 is responsive to changes in the magnetization of magnetic circuit 20, the output impedance is established by the characteristics of the coil itself and the magnetic circuit of transducer 10. Coil 22 may be designed to provide efficient coupling with magnetic circuit 20, while at the same time providing a relatively low output impedance. This relatively low output impedance reduces the complexity of the amplification means to be connected across terminals 24, 24' to process the pyromagnetic signal. By way of example, the output impedance of a typical pyromagnetic detector is of the order of kilohms, whereas that of pyroelectric detectors is of the order of megohms. The input impedance of the amplification means is preferably matched with the output impedance of the detector to obtain optimum response.

Figure 3:
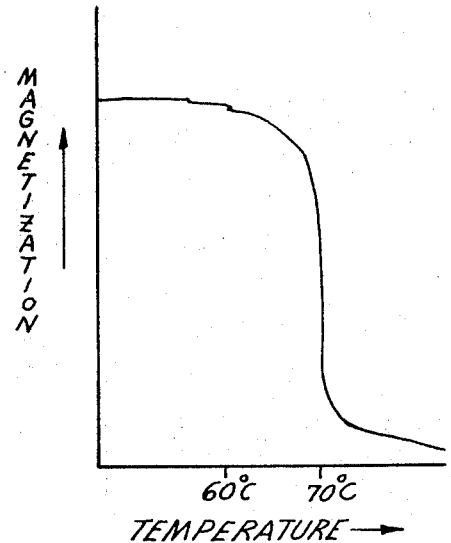
FIG. 3 is the magnetization-temperature curve of a substance having a first order magnetic transition region.
Figure 4:
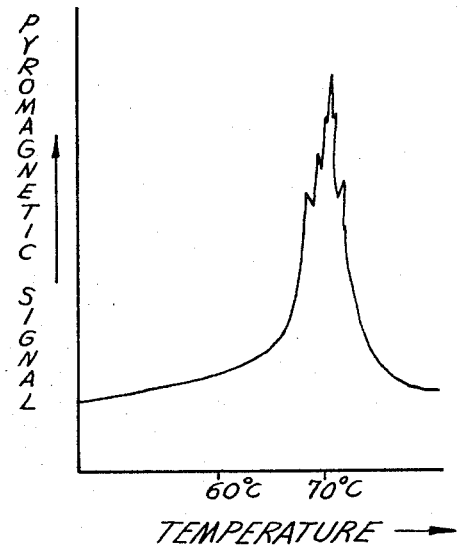
FIG. 4 is the pyromagnetic signal-temperature curve of a substance having a first order magnetic transition region.
Figure 5:
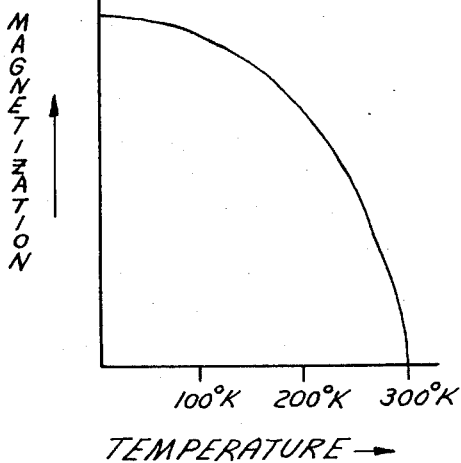
FIG. 5 is the magnetization-temperature curve of a substance having a second order magnetic transition region.
Figure 6:
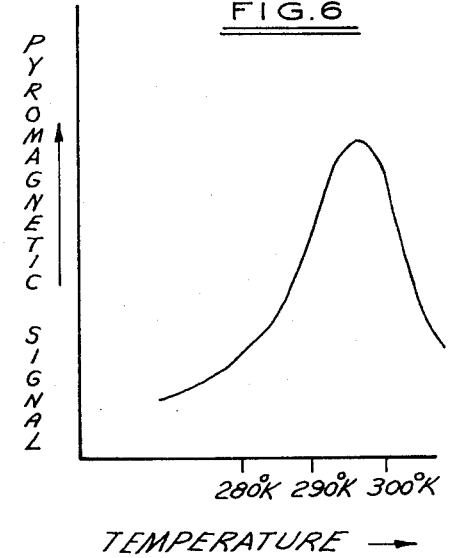
FIG. 6 is the pyromagnetic signal-temperature curve of a substance having a second order magnetic transition region.

The pyromagnetic characteristics of two types of pyromagnetic materials can be best considered with reference to FIGS. 3 through 6. FIGS. 3 and 4 show the magnetization and the pyromagnetic signal respectively as functions of sensor temperature for a material having a first order pyromagnetic transition. FIGS. 5 and 6 show the corresponding curves for a sensor material having a second order pyromagnetic transition. In each of the four figures, radiation of a constant intensity is applied to the material at a constant chopping rate. That is, radiation is directed on the material for a predetermined on-time and then removed for a predetermined off-time, this cycle being continuously repeated.

Referring more particularly to FIG. 3, the magnetization which is presented on a relative scale for the material iron-manganese-arsenide exhibits a marked transition at a temperature of approximately 70 degrees C. A first order transition is theoretically defined as a discontinuity in a thermodynamic potential. Since magnetization is a thermodynamic potential, the slope of the curve in FIG. 3 is theoretically infinite at the transition. The temperature at which this transition takes place is often designated as the critical temperature of the material. FIG. 4 indicates that the pyromagnetic signal for iron-manganese-arsenide is a maximum at this critical temperature. With a detector material having a first order transition the detector must be well stabilized with respect to the temperature so that maximum pyromagnetic signals may be obtained.

FIG. 5 shows the magnetization curve for the material manganese-germanide. In contrast with FIG. 3, where the magnetization experienced a very rapid decrease within a narrow temperature range, the transition in manganese-germanide is more gradual. This is referred to as a second order transition. FIG. 6 indicates the pyromagnetic signal obtained from manganese-germanide over the indicated temperature range. Theoretically, the pyromagnetic signals obtained from a material having a second order transition should be less than those obtained from a material having a first order transition. However, other properties such as thermal hysteresis affect the magnitude of the signals, and these effects are more prevalent in materials with first order transitions. Also, as is apparent from FIG. 6, the pyromagnetic signal in a second order transition material occurs within a substantially wider temperature range than in the first order material. Thus, the temperature regulation of the detector having a second order transition is not as critical.

While the magnetization and pyromagnetic signal curves of iron-manganese-arsenide and manganese-germanide are representative of many pyromagnetic materials, it will be appreciated that there are other materials whose characteristics differ from those just described. For one example, although sensor 12 of transducer 10 was described as being customarily magnetically saturated, some pyromagnetic materials provide maximum pyromagnetic signals when they are not fully saturated. Other materials may exhibit a hysteresis effect in the pyromagnetic signal as the temperature varies within a given range. Still other sensor materials may exhibit varying responses for different frequencies or amplitudes of input signals, thereby emphasizing their nonlinear characteristics. Furthermore, the temperatures at which the magnetic transition occurs vary from material to material.

While some of the aforementioned characteristics may cause problems in achieving optimum detector performance, it may be possible to apply one or more of these seemingly troublesome characteristics in a detector design so as to achieve a highly desirable result. For example, since the temperatures at which the magnetic transition occurs vary from material to material, a pyromagnetic detector may be designed to operate over a wide temperature range by incorporating a plurality of different detector materials. Because of the ready availability of a large number of pyromagnetic materials having various magnetic transition regions, it is presently contemplated that a 0° to 1,400°K temperature range may be achieved by providing a plurality of different materials each of which is pyromagnetically responsive over a selected temperature interval.

A further advantage of the pyromagnetic detector of the invention resides in the aforementioned availability of a large number of pyromagnetic materials. Many of these materials can be readily adapted for use as a pyromagnetic sensor. In general, the metallic type, of which gadolinium is a prime example, are non-hygroscopic, easily machined, rugged and relatively inexpensive. Thus, a pyromagnetic sensor may be constructed by conventional metallurgic processing rather than by the delicate, sensitive steps often required in semiconductor fabrication. Moreover, many potential pyromagnetic materials are suited for thin film application to a substrate by means of a vacuum evaporation process. Not only does this make it quite easy to realize the thin layers that contribute to the high sensitivity and rapid response time of the pyromagnetic detector of the invention, but it means that pyromagnetic sensors can be conveniently miniaturized, batch fabricated and integrated with their conductors and other components. It is presently contemplated that such elemental metals as cobalt, iron and dysprosium (in addition to gadolinium) and such binary compounds as NiFe, MnAs, FeRh and $CoS_2$ could be used as sensors without significantly modifying their present metallurgical processing.

Figure 7:
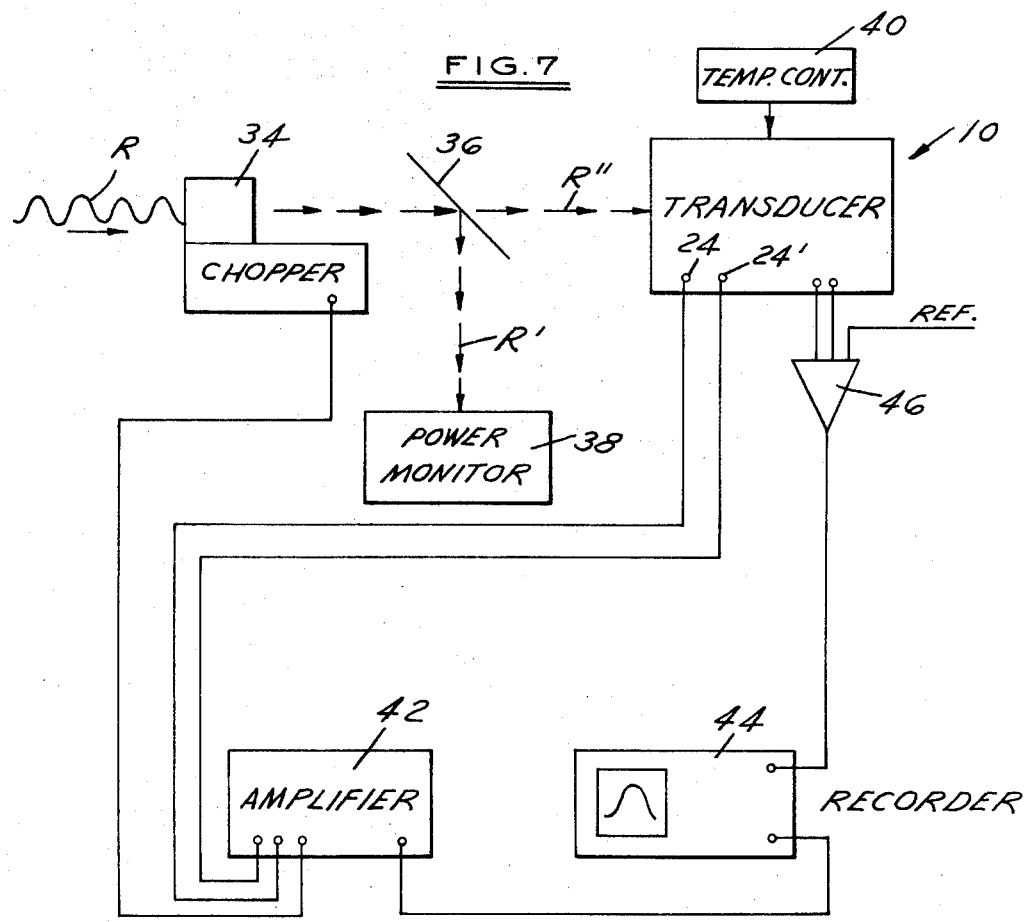
FIG. 7 is a schematic block diagram of the arrangement for measuring the pyromagnetic response of a material.

FIG. 7 shows an arrangement for practicing a method of measuring the response characteristics of pyromagnetic materials. Input radiation R of constant intensity is modulated in on-off fashion by a chopper 34 and then separated into two portions by a beam splitter 36. One portion R' is diverted to a power monitor 38 for measuring the intensity of radiation R (the ratio of R' to R being established by beam splitter 36) while the other portion R'' is directed on pyromagnetic transducer 10. A temperature controller 40 accurately regulates the temperature of transducer 10. Both a reference signal from chopper 34 synchronous with the modulation frequency and the pyromagnetic signal from transducer 10 are supplied as inputs to an amplifier 42. Amplifier 42 processes the chopper reference signal and the pyromagnetic signal for display on one axis of a two-axis recorder 44. The other axis of recorder 44 is supplied from an amplifier 46 which monitors the temperature of transducer 10 by means of a thermocouple (not shown). With this arrangement, curves such as those shown in FIGS. 4 and 6 are recorded.

In order to record a pyromagnetic signal-temperature curve, control 40 slowly increases the temperature of transducer 10 at a uniform rate thereby causing the pen of recorder 44 to traverse horizontally. Concurrently, amplifier 42 mixes the pyromagnetic signal from terminals 24, 24' with the synchronous reference signal from chopper 34 to provide control for the vertical deflection of the recording pen. Since amplifier 42 has a very narrow equivalent noise bandwidth, the output signal of amplifier 42 provides an output having a large signal-to-noise ratio, and hence is very accurate.

If incident radiation R lies within the visible portion of the spectrum, a radiation power monitor such as model 560 with a model 561 detector head available from E. G. & G. Corporation, Boston, Mass. may be used for power monitor 38. For radiation in the infrared region, a model 9960 thermo pile available from Epply Labs, Inc., Newport, R.I. may be used. A suitable chopper 34 and amplifier 42 may be obtained from Princeton Applied Research Corporation, Princeton, N.J. as Model Nos. 125 and HR-8 respectively. In the far infra-red region, semiconductor diode detection can be used.

During recording, the intensity of incident radiation R and the frequency of chopper 34 are fixed so that the curve obtained applies to a specific intensity of radiation and a specific modulation frequency. Other curves may be obtained in the same fashion for different levels of radiation intensity and different modulation frequencies. In this way, the pyromagnetic response of a material may be correlated to the incident radiation for calibrating the detector.

FIG. 8 shows a complete radiation detector incorporating pyromagnetic transducer 10. The input radiation to be monitored is directed through chopper 34 to transducer 10, which has a sensor 12 of known response characteristics. The temperature of the transducer is stabilized by controller 40. The input radiation to transducer 10 is pyromagnetically detected and the output voltage from transducer 10 is supplied to an amplifier 48 which amplifies this signal for recording or other use as desired. By operating chopper 34 at a constant chopping rate, the magnitude of the output signal of the detector represents the magnitude of the intensity of radiation R. Hence, as the radiation intensity increases and decreases, so does the detection output signal.

FIGS. 9, 10 and 11 disclose modifications of pyromagnetic sensor 12. The sensors of these modifications may be remotely spaced from the more bulky structure of FIG. 1 to thereby provide miniaturized transducers. This allows arrangement of a plurality of sensors in an array configuration as well as the use of a single transformer for many sensors.

The sensor of FIG. 9 comprises a tubular member 50 of pyromagnetic material. A coil 52 is wound on tube 50 and has output terminals 54, 54' adapted to be connected to means for amplifying the pyromagnetic signal (not shown). In operation, an axially extending magnetic moment is provided in tube 50, and the inner wall of the tube may receive incident radiation. The tube may also be tapered to enhance the reception of incident radiation on the inner wall. The pyromagnetic signal appears across terminals 54, 54'.

FIG. 10 shows a sensor 53 formed from a thin foil of pyromagnetic metal such as gadolinium. Sensor 53 comprises two parallel spaced-apart rectangular portions 55 whose nearer adjacent edges are connected together by a looped portion 53'. Because gadolinium is an electric conductor in addition to being pyromagnetic, the looped portion 53' forms a one-turn coil. In operation, loop 53' is magnetically biased to provide a magnetic moment therein which extends axially of looped portion 53'. When radiation is directed on sensor 53, as against the radially inner wall of loop 53', a pyromagnetic voltage is produced between the rectangular portions 55.

FIG. 11 discloses a thin flake of pyromagnetic material 51 having a coil 51' wound about its axis. Output terminals 56, 56' are adapted to be connected to amplifying means (not shown). In operation, the sensor is biased by an axially extending magnetic field and radiation is directed upon its surface. The pyromagnetic signal appears across terminals 56, 56'.

Figure 13:
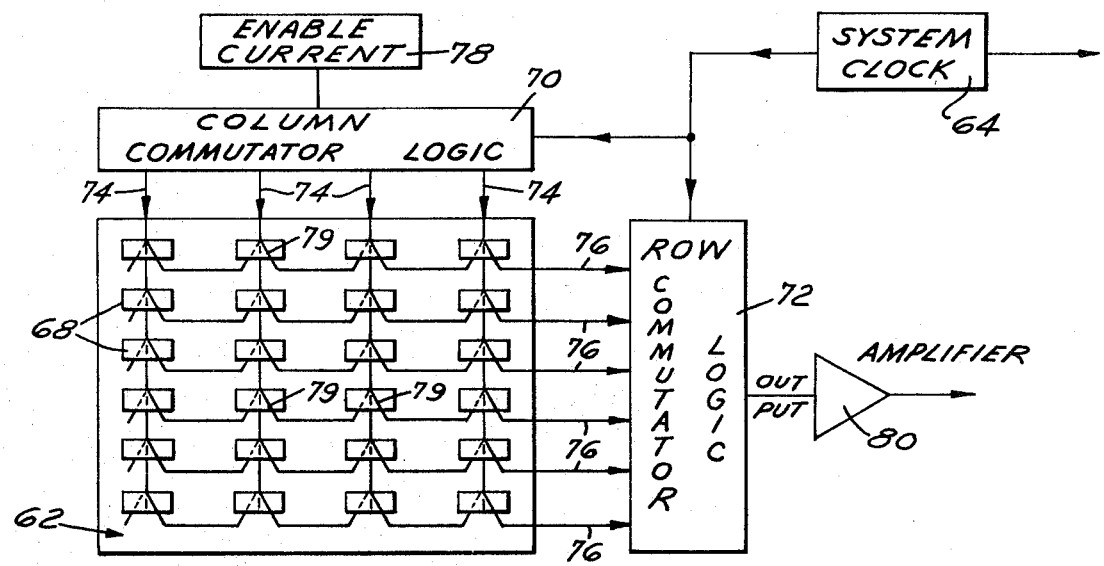
FIG. 13 is a schematic block diagram showing additional details of the elements of FIG. 12.
Figure 14:
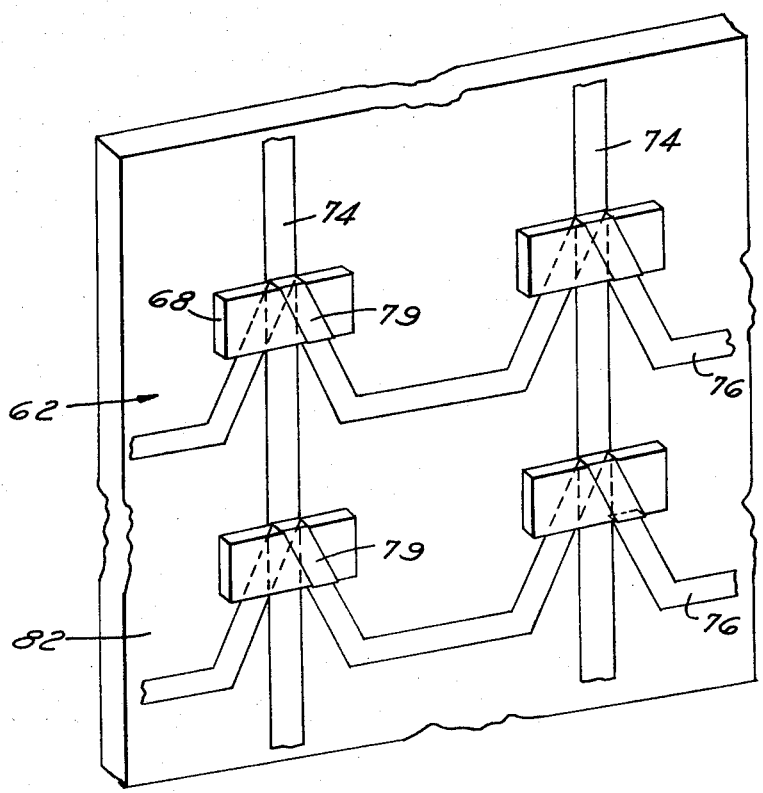
FIG. 14 is a fragmentary perspective view of a portion of FIG. 13.

FIGS. 12, 13 and 14 disclose a pyromagnetic detector having a plurality of miniaturized pyromagnetic sensors in an imaging array configuration. Whereas a single pyromagnetic detector can indicate the intensity of incident radiation from a radiation source, more sophisticated techniques are required if more information is desired about the source. One such technique comprises dividing the radiating source (the object field) into discrete areas, directing the radiation from each discrete area onto a sensor associated with that area, and sequentially sampling the signal response of each sensor. In this way, the object field is effectively scanned in much the same manner as in an image orthicon tube of a television camera.

Referring more particularly to FIG. 12, radiation R from the object field is directed through a lens 60 interposed in front of chopper 34. Lens 60 focuses the totality of radiation R from the object field onto a detector mosaic 62. A system clock 64 and an output processor 66 translate the information from the object field into the desired form.

The details of detector mosaic 62 are better shown in FIG. 13 wherein detector mosaic 62 is seen to comprise a plurality of pyromagnetic sensors 68 in a rectangular array. Lens 60 subdivides the object field into discrete areas and focuses radiation R such that the radiation emanating from each discrete area of the object field is directed upon a sensor 68 associated with that area.

Also associated with detector mosaic 62 are a column commutator logic 70 and a row commutator logic 72. Column conductors 74 extend lengthwise of each column of sensors 68 in mosaic 62 to thereby operatively connect each column with column commutator logic 70. Row conductors 76 extend lengthwise of each row of sensors 68 in mosaic 62 to operatively connect each row with row commutator logic 72. Column commutator logic 70 directs an enabling current 78 sequentially through column conductors 74. Conductors 76 comprise a number of one-turn coils 79 surrounding each sensor 68 corresponding to the number of columns in mosaic 62. The magnetic field created by the flow of enabling current 78 through a column conductor 74 magnetically biases each sensor 68 in that column, and thus renders the sensors in that column pyromagnetically responsive to incident radiation. Each sensor 68 in that column may then be sequentially sampled through its associated row conductor 76 by means of row commutator logic 72.

In operation, system clock 64 regulates column commutator logic 70 and row commutator logic 72 so that the incident radiation on each sensor 68 is sequentially sampled. For example, in the first sampling interval, sensor 68 in the upper left-hand corner of mosaic 62 in FIG. 13 (first column, first row sensor) is supplying a pyromagnetic signal over its row conductor 76 through row commutator logic 72 to an output amplifier 80 for subsequent processing. In the second sampling interval, the sensor 68 immediately below the upper left-hand sensor (first column, second row sensor) is supplying its output through its row conductor 76, and so on down the column. After each sensor in the column has been sampled, the sensors 68 of the second column are sequentially sampled in the same manner. This process is continued for each column until each sensor of the array has been sampled at which time the process is repeated.

FIG. 14 shows in more detail the construction of detector mosaic 62. Column conductors 74 are deposited on an insulating substrate 82 such as glass or ceramic. Row conductors 76 having a number of one-turn coils 79 corresponding to the number of columns in the array are applied to substrate 82 so as to be electrically insulated from conductors 74. Pyromagnetic sensors 68 are inserted within each coil 79. As current flows in one of the column conductors 74, the magnetic field associated with that current passes generally lengthwise through each sensor 68 in that column. With coil 79 surrounding the magnetic field in each sensor, any change in the magnetic field in response to incident radiation appears as a pyromagnetic signal voltage in coil 79. By sequentially detecting the voltage in each coil 79, more detailed information is obtained from the object being scanned. As will be appreciated, the size of the array and the sampling rate must be established by the amount of information required from the object being scanned.

It should be understood from the foregoing description that proper detection can occur only when the pyromagnetic sensor is temperature biased for operation within the magnetic transition region of the particular material from which the sensor is constructed. While this distinguishing feature is necessary for proper operation of the detector, it must be appreciated that with some pyromagnetic materials, especially those having second order transitions, it may be very difficult to precisely define the magnetic transition region. In most instances, a pyromagnetic detector will be thermally biased to a temperature whereat the slope of the magnetization-temperature curve is maximum. With this bias, the detector gain, and hence the detector sensitivity, are maximized. However, it should be understood that acceptable detector operation may be achieved even when the pyromagnetic sensor is thermally biased to a different temperature which is still within the magnetic transition region of the sensor material. The scope of the phrase "magnetic transition region," as used in the subsequent claims, is intended to encompass such bias arrangements.

We claim:

1. The method of detecting electromagnetic radiation comprising:
   magnetizing a pyromagnetic material to thereby establish a magnetic moment within said material, said material being of the type having a magnetic transition region wherein the magnetic moment varies with the temperature of said material;
   thermally biasing said material such that the operation thereof is maintained within a portion of said magnetic transition region wherein a given change in material temperature causes a greater change in said magnetic moment than in other portions of said magnetic transition region;
   exposing said material to electromagnetic radiation to generate heat therein;
   and detecting the rate of change of said magnetic moment.

2. The method of claim 1 wherein the rate of change of magnetic intensity with temperature is a maximum within said portion.

3. The method of claim 1 wherein said detecting step comprises detecting the voltage output of a coil which is magnetically linked with said magnetic moment of said material.

4. The method of detecting electromagnetic radiation comprising:
   magnetizing a pyromagnetic material to thereby establish a magnetic moment within said material;
   exposing said material to repetitive time-varying electromagnetic radiation;
   varying the temperature of said material over a selected temperature range;
   measuring the rate of change of said magnetic moment in response to said time-varying radiation at selected material temperatures within said temperature range;
   removing said material from exposure to said time-varying radiation;
   selecting one of the measured rates of change of said magnetic moment which is relatively large compared to other of said measured rates;
   thermally biasing said material such that the temperature thereof is maintained substantially at the temperature corresponding to said selected one of said measured rates;
   exposing said material to electromagnetic radiation;
   and detecting the rate of change of said magnetic moment in response to said last-mentioned electromagnetic radiation.

5. The method of measuring the response characteristic of a pyromagnetic material as a function of the intensity of radiation incident thereon comprising:
   magnetizing said pyromagnetic material to thereby establish a magnetic moment therein;
   maintaining a selected temperature of said material;

providing a source of constant intensity radiation;
modulating the radiation radiated by said source;
exposing said material to the modulated radiation;
measuring the rate of change of said magnetic moment in response to said modulated radiation;
measuring the intensity of the radiation radiated by said source;
and correlating the measured rate of change of said magnetic moment to the measured intensity of the radiation radiated by said source.

6. The method of claim 5 wherein said modulating step comprises chopping said radiation.

7. A pyromagnetic radiation detector comprising a pyromagnetic sensor adapted to receive time-varying electromagnetic radiation, said sensor being of the type having a magnetic transition region wherein the magnetic moment thereof varies with the temperature thereof, means for magnetically biasing said sensor to thereby establish a magnetic moment within said sensor, means for thermally biasing said sensor such that the operation thereof is maintained within a portion of said magnetic transition region wherein a given change in sensor temperature causes a greater change in said magnetic moment than in other portions of said magnetic transition region, and means responsive to the rate of change of said magnetic moment for supplying a pyromagnetic signal in response to said radiation.

8. The detector of claim 7 wherein the rate of change of magnetic moment with temperature is a maximum in said portion.

9. The detector of claim 7 wherein said magnetic bias means comprises a permanent magnet and magnetic circuit means magnetically linking said magnet and said sensor in a magnetic circuit, said magnetic circuit means comprising material which remains magnetically unsaturated when magnetically coupled to said permanent magnet in said magnetic circuit.

10. The detector of claim 7 wherein said sensor comprises a thin film of pyromagnetic material on a substrate.

11. The detector of claim 7 further comprising modulating means for modulating the radiation directed toward said sensor, whereby the radiation incident upon said sensor is time-varying and said pyromagnetic signal is supplied in response to the time-varying radiation.

12. The detector of claim 11 wherein said modulating means comprises means for repetitively chopping radiation directed toward said sensor to thereby provide said time-varying radiation.

13. In a radiation detector having a pyromagnetic sensor magnetically biased within a magnetic transition region wherein the magnetic moment thereof varies with the temperature thereof and thermally biased to maintain operation thereof within said magnetic transition region, a pyromagnetic sensor comprising an electrically conductive metallic pyromagnetic material having a pair of spaced-apart members adapted to supply a pyromagnetic voltage and a portion connecting said two members and adapted to receive time-varying electromagnetic radiation, said portion functioning as a coil for sensing the variation of magnetic moment, said sensor being responsive to said radiation by supplying a pyromagnetic voltage across said two members.

14. The pyromagnetic sensor of claim 13 wherein said pyromagnetic material is a thin foil of gadolinium.

15. In a radiation detector having a pyromagnetic sensor magnetically biased within a magnetic transition region wherein the magnetic moment thereof varies with the temperature thereof and thermally biased to maintain operation thereof within said magnetic transition region, a pyromagnetic sensor comprising a tubular member of pyromagnetic material adapted to receive time-varying electromagnetic variation and a coil magnetically linked with said tubular member for supplying a pyromagnetic voltage in response to said radiation.

16. A pyromagnetic radiation detector comprising a plurality of pyromagnetic sensors arranged in array configuration and adapted to receive time-varying electromagnetic radiation, each of said sensors being of the type having a magnetic transition region wherein the magnetic moment thereof varies with the temperature thereof, means for magnetically biasing each of said sensors to thereby establish a magnetic moment within each of said sensors, means for thermally biasing said sensors such that the operation of each sensor is maintained within its magnetic transition region and means responsive to the rate of change of the magnetic moment of each sensor for supplying a pyromagnetic signal in response to said radiation.

17. The detector of claim 16 wherein said magnetically biasing means comprises current-carrying conductors linking said sensors, and wherein said pyromagnetic signal supplying means comprises coil means linking said sensors.

* * * * *